United States Patent
Ward

(10) Patent No.: US 10,523,898 B1
(45) Date of Patent: Dec. 31, 2019

(54) ONE-WAY VIDEO CONFERENCING

(71) Applicant: Securus Technologies, Inc., Carrollton, TX (US)

(72) Inventor: Mario Ward, Plano, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/950,966

(22) Filed: Apr. 11, 2018

(51) Int. Cl.
| | |
|---|---|
| *H04N 7/14* | (2006.01) |
| *H04N 7/15* | (2006.01) |
| *G06F 16/735* | (2019.01) |
| *G06F 16/955* | (2019.01) |

(52) U.S. Cl.
CPC .............. *H04N 7/15* (2013.01); *G06F 16/735* (2019.01); *G06F 16/955* (2019.01)

(58) Field of Classification Search
CPC .............. G01S 5/0072; G06F 17/3028; G06F 17/30828; G06F 17/30876; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185

USPC ......... 348/14.01, 14.02, 14.03, 14.04, 14.05, 348/14.06, 14.07, 14.08, 14.09, 14.1, 348/14.11, 14.12, 14.13, 14.14, 15.15, 348/14.16; 382/275; 379/265; 455/414.1, 566; 704/270
See application file for complete search history.

(56) References Cited

U.S. PATENT DOCUMENTS

| | | | | |
|---|---|---|---|---|
| 6,205,716 | B1 * | 3/2001 | Peltz ..................... | E04H 1/125 345/905 |
| 6,914,772 | B2 * | 7/2005 | Hesse ..................... | E04H 1/14 312/223.2 |
| 8,855,280 | B1 * | 10/2014 | Passe .................. | H04M 3/2281 379/126 |
| 2004/0252447 | A1 * | 12/2004 | Hesse ..................... | E04H 1/14 361/679.23 |

* cited by examiner

*Primary Examiner* — Khai N. Nguyen
(74) *Attorney, Agent, or Firm* — Fogarty LLP

(57) ABSTRACT

Systems and methods for blocking, adding, and/or modifying video content in a video conference session are disclosed. A video conferencing session is established between a first device and a second device. Video conferencing session data that is received from the first device comprises only audio information. Video conferencing session data that is received from the second device comprises both audio and video information. Video content is added to the video conferencing session data from the first device before sending the video conferencing session data to the second device. The added video content is not captured from the first device.

17 Claims, 3 Drawing Sheets

ONE-WAY VIDEO CONFERENCING

BACKGROUND

Correctional departments that are responsible for hosting incarcerated inmates are continually developing methods and activities to rehabilitate the inmates before their release back into society. One activity thought to aid in that transition is communication with friends and family outside the correctional facility. By allowing inmates to have contact with friends and family while incarcerated, the justice system hopes to maintain friendships and family relationships with people who will facilitate the inmate's transition back into society upon release.

Traditional forms of contact include letter writing, telephone calls, in-person visitation, etc. Technology now allows jails and prisons to provide other types of visitation, including video conferences (e.g., a scheduled video visitation, an unscheduled video call, and online chat sessions) between inmates and their friends and family who are outside the correctional facility. These video conferences allow friends and family to visit the inmate without having to travel to the correctional facility and/or without having to move the inmate to a visitation room in the facility.

SUMMARY

For traditional in-person visits at a correctional facility, inmates are brought to a visitation area within the facility to meet with friends and family during the visit. This requires staff (e.g., guards or correctional officers) to escort the inmates from their cell or pod to the visitation area. Additional staff is required to observe the inmates during the visit. However, a scheduled video visitation session or an unscheduled video calling session may be initiated from many different areas in the facility, such as at a fixed terminal or kiosk in a video conference room or on a portable tablet or device in a cell, pod, or other area. If the video conference occurs in a secure area away from visitors, such as in the inmate's pod or cell, then there is likely no dedicated monitoring of the inmate and the video conference session by the staff.

Due to security and privacy concerns, some facilities may restrict the use of cameras on the inmate side of a video conference session. In such facilities, the camera on the inmate's device (e.g., tablet, kiosk, or terminal) may be disabled or the inmate's device may not have a camera installed. However, it is still desirable to allow inmates to communicate with friends and family outside the facility and to allow the inmate to see video of their friends and family even if video of the inmate is not allowed or available.

Embodiments disclosed herein provide for systems and methods for blocking, adding, and/or modifying video content in a video conference session. A video conferencing session is established between a first device and a second device. Video conferencing session data that is received from the first device comprises only audio information. Video conferencing session data that is received from the second device comprises both audio and video information. Video content is added to the video conferencing session data from the first device before sending the video conferencing session data to the second device. The added video content is not captured from the first device.

The video content may be selected based upon a user profile. User profile data may include, for example, trust and calling account balances, trial schedules, conviction data, criminal records, sentencing data, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff.

The first device may include a camera, and the camera may be disabled based upon one or more of a device identifier, location, called party, calling party, security designation, or time.

A source is identified for the video content to be added to the video conferencing session data from the first device. The video content is then retrieved from the source to be added to the video conferencing session. The source of the video content may be identified using a user profile database. The source of the video content may be a database identified by a Uniform Resource Identifier. The source of the video content may be a camera that provides a video feed separate from the first device.

The first device may be assigned to a user in a controlled-environment facility, and the second device may be assigned to a user outside the controlled-environment facility. The camera on the first device may be disabled when the device is used within the controlled-environment facility.

The first device may have no camera installed or may have its camera disabled based upon the first device's location or a network to which the first device is attached.

The added video content may be an avatar that is animated based upon audio information content received from the first device. The avatar may also be animated based on facial recognition applied to the user.

In another embodiment, a communications system in a controlled-environment facility, comprises a communications management system configured to establish a video conferencing session between a first device and a second device, wherein the communications management system receives only audio information from the first device and receives both audio and video information from the second device; and comprises a video processing module configured to add video content to video conferencing session data from the first device before sending the video conferencing session data to the second device.

The communications system may further comprise a user profile database, wherein the video content is selected based upon a user profile.

The first device may comprise a camera, and the camera may be disabled based upon one or more of a device identifier, location, called party, calling party, security designation, or time.

The communications system may further comprise a database of video content coupled to the video processing module.

BRIEF DESCRIPTION OF THE DRAWINGS

Figure 1:
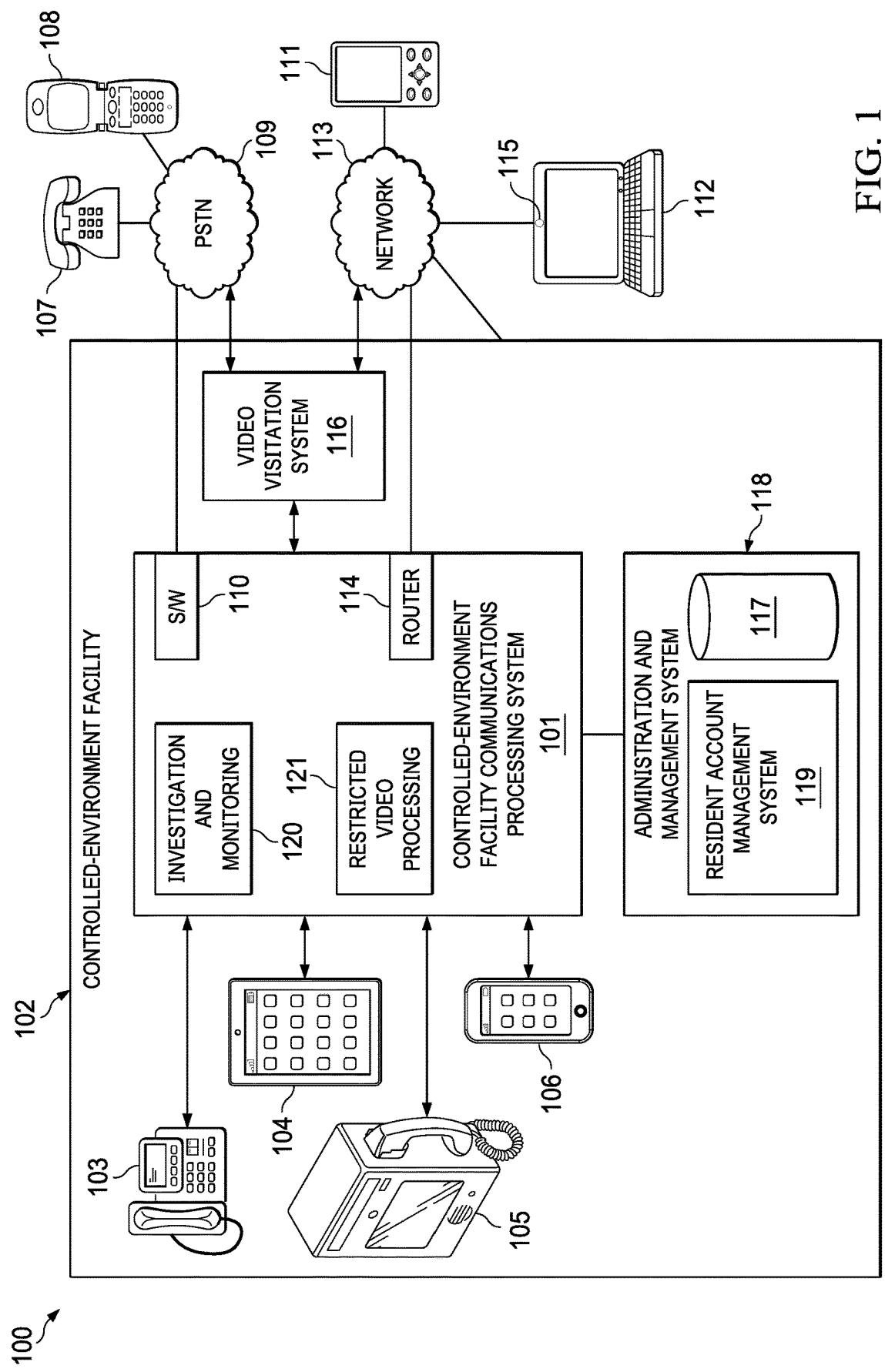

Having thus described the invention in general terms, reference will now be made to the accompanying drawings, which are not necessarily drawn to scale, and wherein:

FIG. 1 illustrates an example communications environment in which systems and methods for management of one-way video conferencing may be deployed.

Figure 2:
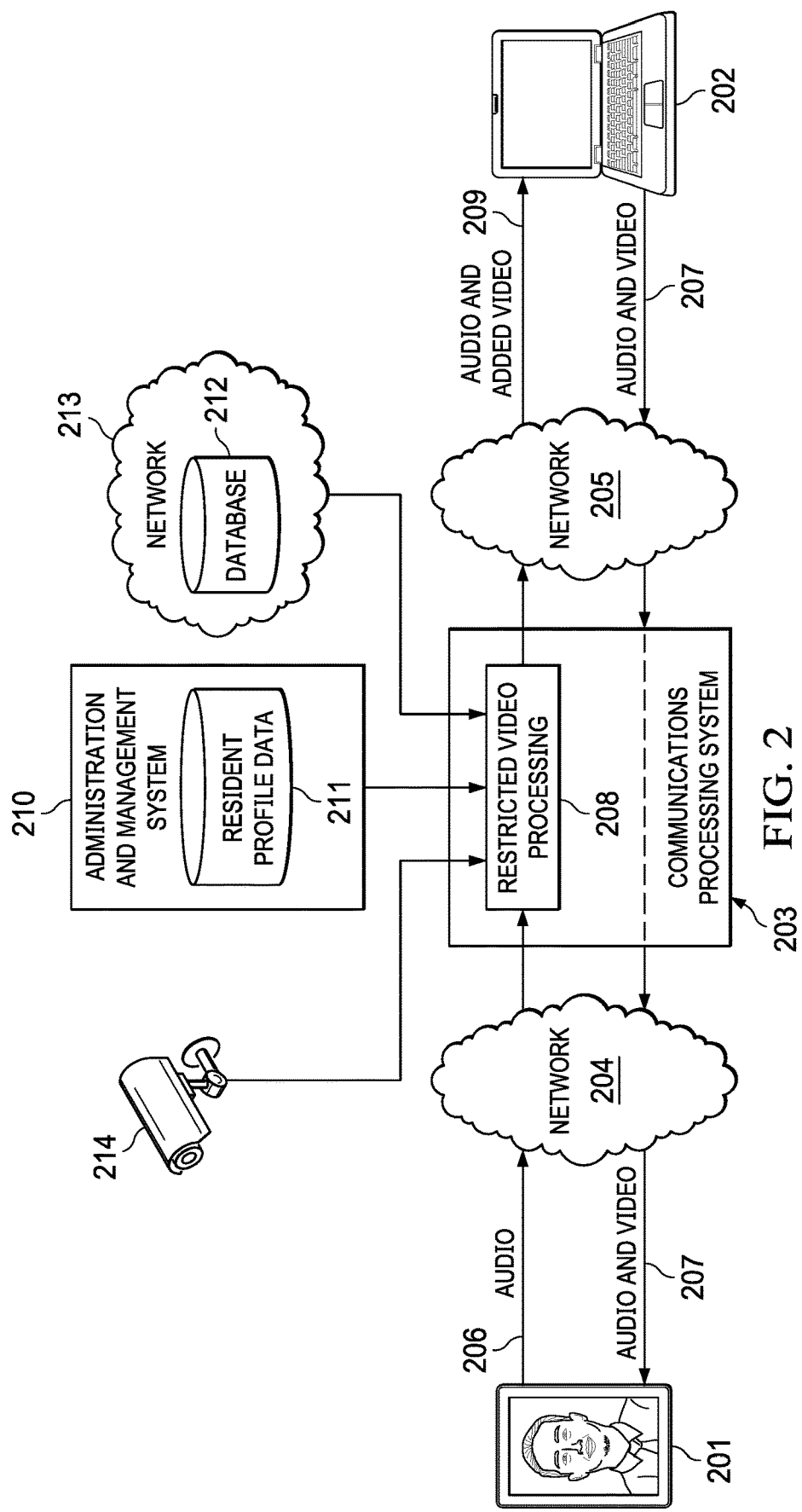

FIG. 2 is a block diagram illustrating a one-way video conference session according to an example embodiment.

Figure 3:
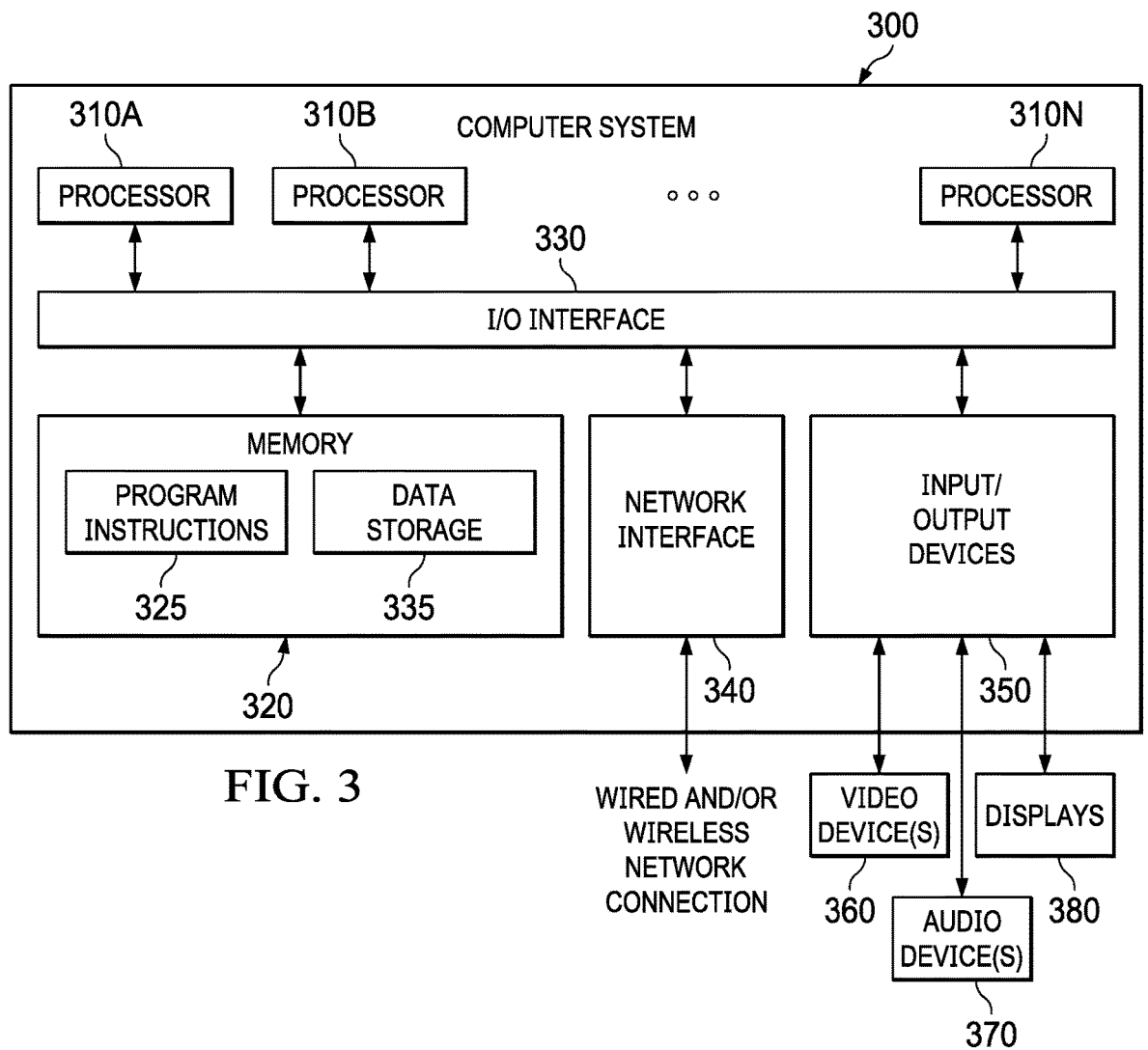

FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

The systems and methods disclosed herein relate generally to communications with residents of controlled-environment facilities. More specifically, systems and methods are disclosed to illustrate various example embodiments to support video conferences between residents of controlled-environment facilities and other individuals. Those individuals may include, for example, friends, family, attorneys, bail bondsmen, and others who are located outside the facility (i.e., "non-residents") as well as other residents, such as staff within the controlled-environment facility (e.g., corrections officers, guards, medical personnel, administrators, and others). As used herein, the term video conference will be understood to refer to any live, visual connection between two or more people for the purpose of communication, including video visitation, video calling, video chat, teleconferences, and/or webinars, wherein video content is available in at least one direction or for one party, whether or not the video conference was scheduled or unscheduled. One-way video conferencing as used herein will be understood to refer to a video conference in which video is not available from one participant, which may be due to the lack of a camera or a disabled camera.

In accordance with some embodiments, during a video conference between a resident and a non-resident, audio and video information is captured by the non-resident's communications device in real-time and streamed to the resident's communication device. Simultaneously, audio information is captured by the resident's device and streamed to the non-resident's communication device. A communications management system at the controlled-environment facility may manage and control the video conference session. This enables a resident to use any fixed or mobile device for video conferencing from inside the controlled-environment facility without compromising security. The systems and methods disclosed herein provide a higher level of privacy during the video conference by eliminating the inadvertent capture of images or videos of non-participating residents during the video conference.

FIG. 1 illustrates an example communications environment 100 in which systems and methods for management of one-way video conferencing may be deployed. Communications processing system 101 provides telephone services, video conferencing, online chat, and other communication services to controlled-environment facility 102. Communications processing system 101 may be co-located with controlled-environment facility 102 as illustrated. Alternatively, communications processing system 101 may be centrally or remotely located with respect to one or more controlled-environment facilities and/or may provide communication services to multiple controlled-environment facilities. More generally, however, it should be noted that communications processing system 101 may assume a variety of forms, such as any processor-based computing system hosted on a dedicated server or distributed among one or more virtual or cloud-based servers. Communications processing system 101 may be configured to serve a variety of facilities and/or users, whether within or outside of a controlled-environment facility.

Residents of controlled-environment facility 102 may use conventional telephones 103 to access services via communication processing system 101. Alternatively, residents may use a portable wireless device 104, such as a tablet computing device, laptop, or smartphone, that has been adapted and/or approved for use in controlled-environment facility 102. Such a device 104 may be referred to as a resident communications device or Intelligent Resident Device (IRD). In a correctional institution, such an IRD 104 may be referred to as an Intelligent Inmate Device (IID), or the like. In some facilities, a resident may use a video communication device 105 for standard voice calls as well as for video communication. Video communication device 105 may be referred to as an Intelligent Facility Device (IFD), which may be a specialized video conferencing terminal, such as a processor-based self-service kiosk user terminal.

Generally, IFD 105 may be disposed in a dedicated location, such as a visitation room, day room, or pod. On the other hand, IRD 104 is portable and may be used in various locations throughout controlled-environment facility 102. IRD 104, IFD 105, or similar devices may have video capabilities that enable residents to participate in two-way video conferencing sessions with other parties. For security, privacy, and/or cost-saving reasons, some other devices 106 may have a display screen but not a camera. Devices 106 may be a tablet computing device, laptop, smartphone, or other personal wireless device that functions like device 104, but that is only able to participate in one-way video conferencing sessions with other parties.

Each portable IRD 104 or cameraless device 106 may be particularly adapted for use in a controlled-environment. For example, in a correctional institution, jail, prison, or the like, such devices may be "stripped-down," particularly from the standpoint of the application programs (apps) that are provided or allowed on the device and/or the connectivity afforded to the device. For example, devices 104 and 106 may be adapted to connect only to a network in the controlled-environment facility and/or connect only within certain locations in the controlled-environment facility. Such connectivity may be controlled, for example, by providing Wi-Fi access only in certain areas. Resident Wi-Fi access may be compartmentalized within the controlled-environment facility by selective placement of wireless access points, antenna directionality of the wireless access points, or other measures that limit Wi-Fi signal coverage.

Devices 104-106 may have a limited number of applications pre-installed, such as a communications or video conferencing program. The installation of additional applications on devices 104-106 may be forbidden (e.g., prevented by modifications to the device's operating system or the like) and/or restricted, (e.g., by requiring permission from a facility administrator). The applications provided on devices 104-106 may be associated with particular interests of the controlled-environment facility residents. For example, devices 104-106 might include applications that provide access to legal research services, education or training, employment searching applications, or the like. Hence, devices 104-106 may be used to help soon to be released inmates transition to the world outside the facility. For example, devices 104-106 may be used to obtain skills or training and to communicate with potential future employers.

In some embodiments, devices 104-106 may be implemented as a processor-based system. For example, devices 104-106 may include a processor running software that provides a video conference application. The processor may control any suitable electronic display on devices 104-106, such as a Liquid Crystal Display (LCD), an Organic Light Emitting Diode (OLED) display, a touchscreen display (e.g., resistive, capacitive, etc.), or the like. Devices 104-106 may include a keyboard or keypad input that is a physical part of the device or that appears virtually on the display. Devices 104-106 also have a speaker and microphone, which may be a discrete component or part of handset, that are used by the video conference application. During a video conference session, devices 104-106 may be configured to display a video image of the other party along with audio/voice information. Devices 104-106 capture audio (i.e., speech) from the resident to be transmitted to the other party, but neither captures real-time video or still images or transmits video or still images during the video conference session. There are several possible reasons why one or more of devices 104-106 may not transmit or capture video or still images during the video conference session. For example, device 104 or 105 may have an inoperable camera or device 106 has no camera. Alternatively, the camera on devices 104 and 105 may have a camera that is controlled by communications processing system 101 so that a facility administrator may select whether the camera is turned on or off.

In one embodiment, instead of displaying a blank screen to the other party when video is not available during a video conference, devices 104-106 or communications processing system 101 may provide substitute video or images in place of a real-time video feed from the resident using the device. Although device 103 does not have a display and, therefore, cannot present received video to a user, it will be understood that device 103 may be used to connect to a video conference in an audio-only mode that does not send user video and that ignores received video information.

A resident may initiate a call or video conference by launching an applications program on devices 104-106 or by calling into a conference telephone number using device 103. The resident may then be prompted to provide a personal identification number (PIN), other identifying information, or biometrics. An interactive voice response (IVR) unit (not shown) integrated into communications processing system 101 may generate and play a prompt or other message to the resident on devices 103-106 when initiating the video conference session. Under the control of communications processing system 101, devices 103-106 may be capable of connecting to another party's communication device 107 or 108 (e.g., a non-resident) across publicly switched telephone network (PSTN) 109. Device 108 may be a smartphone or other mobile device, and telephone 107 may be located at a home or office. Switching circuitry 110 in communications processing system 101 may be used to connect calls from the controlled-environment facility network to PSTN 110 and devices 107, 108.

Additionally, or alternatively, a non-resident party may communicate using devices 111 or 112, which may be connected through an Integrated Services Digital Network (ISDN), Voice-over-IP (VoIP) network, or other packet data network 113, such as the Internet. Router 114 is used to route data packets associated with a call or video conference connection to devices 111 or 112. For example, the other party may have a personal or laptop computer 112 with an integrated camera 115 and display. A video conference may be established between resident devices 103-106 and other devices 107-108, 111-112 using any currently known or later developed video conferencing technology, standard, or protocol, such as ITU H.323, H.320, H.264, and/or V.80. Either party may initiate the video conference.

A video conferencing system 116 may be configured to provide, schedule, and manage communication services between residents and non-residents. Although video conferencing system 116 is shown in FIG. 1 as being located with controlled-environment facility 102 and is separate from communications processing system 101, it will be understood that in other embodiments video conferencing system 116 may be located outside facility 102 and/or integrated within communications processing system 101. Video conferencing system 116 and communications processing system 101 receive and/or manage video conferencing signals via networks 116 or PSTN 109. Video conferencing system 116 may be coupled to PSTN 109 and/or network 113 using one or more gateways, switches, and/or routers (not shown). Accordingly, video conferencing system 116 may be configured to communicate with one or more residents of the controlled-environment facility via devices 103-106 and with one or more other parties via devices 107-108, 111-112. Video conferencing system 116 may include one or more media gateways, multimedia servers, and/or the like to facilitate video conferences under direction of a media gateway controller.

In addition to providing certain communication and video conferencing operations, communication processing system 101 typically ensures that the residents' calls, video conferences, online chats, text messages, etc. are connected only to non-residents whose identities, devices, email addresses, phone numbers, etc. are listed in that resident's pre-approved contact (PAC) or personal allowed numbers (PAN) list. The PAC/PAN may be a whitelist or a blacklist that identifies contacts that are allowed or restricted for the resident. Each resident's PAN list may be stored, for example, in a database 117 that is maintained by an administration and management system (AMS) 118, a jail management system (JMS), or the like. In addition to PAC/PAN lists, AMS 118 and database 117 may also store inmate or resident profile data (RPD), such as inmate trust and calling account balances, trial schedules, conviction data, criminal records, sentencing data, release date, cell and cellmate assignments, resident restrictions and warnings, commissary order history, telephone call history, call recordings, known or suspected gang or criminal affiliations, known or suspected affiliates or accomplices, and any other information that may be relevant or useful to correctional facility staff.

In scenarios where communications processing system 101 is located within the controlled-environment facility 102, system 101 may have direct access to AMS 118. In other embodiments, however, communications processing system 101 may be located remotely from the controlled-environment facility 102 and access to AMS 118 may be accomplished via a computer network such as network 113. AMS 118 may further comprise a resident account management system 119 to maintain resident accounts, such as resident communications accounts, commissary accounts, or other accounts that benefit residents. These accounts may be used, for example, to pay for communications, such as phone calls, video conferencing sessions, online chats, emails, text messages, or the like. Resident account management system 119 may be a separate system or may be a part of or a function of AMS 118.

In some embodiments, communications processing system 101 is configured to monitor and/or record the residents' telephone calls and/or video conference sessions. An investigation and monitoring module 120 may record all or some resident communications. The communications may be monitored in real-time by an investigator or automatically monitored to detect the use of selected keywords or non-resident video content, for example. The content and metadata associated with the residents' communications may be recorded and stored for later analysis, review, or investigation.

Communications processing system 101 may further comprise a restricted video processing module 121. When a resident participates in a video conference session using device 103-106 that does not provide a video signal, such as when using a cameraless device or a device with a disabled camera, restricted video processing module 121 may add video content to the resident's side of the session. In other embodiments, a restricted video processing module or application (not shown) on devices 103-106 may provide the same functionality. The added video content may be any video or still image selected by the resident, the other party, or communications processing system 101. The added video content compensates for the lack of video from devices 103-106 so that the other party to the video conference does not see a blank display. The added video content may be, for example, a stored picture or video of the resident or a computer-generated avatar or animation of the resident.

FIG. 2 is a block diagram illustrating a one-way video conference session according to an example embodiment. A video conference session is established between users at restricted video device 201 and camera-enabled device 202. The video signal from device 201 may be restricted because, for example, the device does not have a camera installed or the camera on the device has failed or was disabled. The video conference session is set up and managed by communication processing system 203, which may be collocated with either or both devices 201 and 202 or may be located remote from both devices. Restricted video device 201 is coupled to communication processing system 203 through network 204, and camera-enabled device 202 is coupled to communication processing system 203 through network 205. Networks 204 and 205 may be any appropriate wired or wireless network that is capable of supporting video conference session data transmission.

Devices 201 and 202 may be identified using an IP address associated with the device, a MAC ID of the device, an Address Identifier (AID) of the device, and/or the like. These addresses or identifiers may be used to determine the capabilities of the device. For example, communication processing system 203 may maintain a table or list of known devices and their associated address/identifier and capabilities. When a video conference session is set up, communication processing system 203 links the addresses/identifiers for devices 201, 202 to the session. Based on these identifiers, communication processing system 203 may know the capabilities of each device, such as whether or not the device has a camera installed, has a failed or disabled camera, or has been designated to block captured video.

Although device 201 does not have a camera or has a disabled camera, it is still capable of joining a video conference; however, video of the device 201 user is not provided to the other participants on the video conference. If device 201 does not have a camera or has a disabled camera, then the device sends only the audio or speech information 206 captured from the user. The audio/speech information is forwarded to device 202 by communication processing system 203. On the other hand, device 202 sends both video and audio information 207 to communication processing system 203 and on to device 201. This allows the user at device 201 to see video of the user at device 202 as well as having a conversation with that user. The user at device 202 only receives the audio or speech information from the user at device 201. Using restricted video device 201 prevents the intentional or unintentional transmission of video and images from the location of device 201. This may be used to prevent the background or other people near device 201 from being shown on device 202, which enhances the security and privacy of the area near device 201.

Rather than showing a blank screen on device 202, communications processing system 203 may add video content for device 201 to the video conference session. Restricted video processing module 208 adds video content to the audio information received from device 201 and forwards this combined video conference session data 209 to device 202. Any still image or video may be added by restricted video processing module 208. For example, a profile for the user who is logged in to device 201 may indicate what video content should be added to a video conference session. Restricted video processing module 208 may be a set of software instructions configured to select and/or retrieve video content and to combine that video content with audio information received from device 201. Restricted video processing module 208 may also be configured to generate video content, such as avatars, animation, text, or combinations of existing images or video.

In one embodiment, if device 201 does have a camera, then video of the user may be captured. Instead of transmitting that video on the video conferencing session, device 201 may generate a replacement video or image. For example, the user may select an avatar to use in the replacement video. Facial recognition points may be detected in the video and then used to animate the avatar in a computer-generated video image that would be sent to the other participants in the video conference. If the user was not in camera frame at device 201 (or if the device had no camera), then the selected avatar may appear as a still image or may be animated using other input, such as tone or volume of the user's voice. In alternative embodiments, the video captured on a camera-enabled device 201 may be sent to restricted video processing module 208, which may perform further processing to generate the replacement video or image.

In a correctional facility embodiment, an administration and management system (AMS) 210 may store resident profile data (RPD) 211 for residents. When a resident uses device 201 for a video conference, restricted video processing module 208 accesses the resident's profile in database 211 to determine what content to add to the session. The added content may be stored with the resident's profile in database 211 or may be in some other storage. For example, the resident's profile may include a Uniform Resource Identifier (URI) that points to content on another database 212 on network 213. The resident's profile may designate when replacement video can or should be used. For example, the resident profile may specify particular devices, locations, called/calling parties, security designations, time of day, etc. that trigger blocking user video and/or generating replacement video or images.

Any still image or video may be added by restricted video processing module 208. A still image could include a picture of the user or of any other person, object, or thing that may be displayed on device 202 while the audio received from device 201 is played. The added video may be played on device 202 along with the user audio received from device 201. In other embodiments, restricted video processing module 208 may simply be a capability that allows communication processing system 203 to selectively block video from user device 201 and/or to selectively enable/disable a camera on device 201, without adding a replacement image or video.

One reason to use a restricted-video device for video conferencing is to protect the privacy of others. For example, in a correctional facility, a restricted-video device (i.e., either without a camera installed or with a blocked/disabled camera) allows residents to make calls from their pod or cell while avoiding the unintentional or unapproved capture and recording of video of other residents. However, users of the device 201 may want to provide video of themselves during a video conference session. For those users, the restricted video processing module 208 may add a live video feed from a source other than device 201. A camera 214 may be located in an approved, secure area and may provide a video feed to restricted video processing module 208. The user may initiate the video conference session on device 201 and conduct the session at least in part near camera 214 so that video of the user is captured. Either the user, the user's profile 211, the other party, or restricted video processing module 208 may select the video feed from camera 214 to be added to the video conference session data that is sent to device 202.

As noted above, in another embodiment, the added video content may be an avatar. The avatar may look like the user or may be any real or imaginary animal or being. In some configurations, restricted video processing module 208 generates the avatar, which may be animated so that it appears to speak the audio received from device 201 (lip sync). Restricted video processing module 208 may also interpret the content, volume, or tone of the received audio information (e.g., using speech-to-text processing) and generate appropriate facial expressions on the avatar, such as smiles, frown, raised eyebrows, etc.

Users at device 201 would typically be charged to participate in a video conference session. The charges may vary depending upon the video input used for the video conference session. For example, different rates may be charged for normal (i.e., two-way video), single-side video, replacement-video, replacement-image, added-video, added-image, or avatar video conference sessions.

Embodiments of the present systems and methods for management of one-way video conferencing sessions, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example processes described herein. Computer system 300 may be used as, or as part of, one or more of controlled-environment facility communications processing system 101, 203, resident devices 103-106, 201 non-resident devices 107-108, 111-112, 202, video conferencing system 116, restricted video processing 121, 208, AMS 118, 210, and/or the like. In various embodiments two or more of these computer systems may be configured to communicate with each other in any suitable way, such as, for example, via a wired or wireless network.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. In the example described above, devices 106 and 201 have no video device 360 or such device is disabled during the video conference session. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations, such as, for example, those described in the figures above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
    establishing a video conferencing session between a first device and a second device, the first device comprising no camera or a camera disabled based at least in part upon one or more of a device identifier, location, called party, calling party, security designation, or time, such that, video conferencing session data received from the first device comprises only audio information, and video conferencing session data received from the second device comprises both audio and video information;
    selecting video content or a still image, not captured by the first device during the video conferencing session, based at least in part upon a user profile; and
    adding the video content or still image to the video conferencing session data from the first device before sending the video conferencing session data to the second device.

2. The method of claim 1, further comprising:
identifying a source of the video content or still image to be added to the video conferencing session data from the first device; and
retrieving the video content or still image.

3. The method of claim 2, wherein the source of the video content or still image is identified using a user profile database.

4. The method of claim 2, wherein the source of the video content or still image is a database identified by a Uniform Resource Identifier.

5. The method of claim 2, wherein the source of the video content is a camera that provides a video feed separate from the first device.

6. The method of claim 1, wherein the first device is assigned to a user in a controlled-environment facility and the second device is assigned to a user outside the controlled-environment facility, and wherein the camera on the first device is disabled when the device is used within the controlled-environment facility.

7. The method of claim 1, wherein the first device camera is disabled based at least in part upon the first device's location or a network to which the first device is attached.

8. The method of claim 1, wherein the added video content is an avatar that is animated based upon audio information content received from the first device.

9. A communications system in a controlled-environment facility, comprising:
a communications management system configured to establish a video conferencing session between a first device and a second device, the first device comprising no camera or a camera disabled based at least in part upon one or more of a device identifier, location, called party, calling party, security designation, or time, such that the communications management system receives only audio information from the first device and receives both audio and video information from the second device; and
a video processing module, in part, comprising a user profile database, the video processing module configured to select video content or a still image not captured from the first device during the video conferencing session, based at least in part upon a user profile, and add the video content or still image to video conferencing session data from the first device before sending the video conferencing session data to the second device.

10. The communications system of claim 9, further comprising:
a database of video content and/or still images coupled to the video processing module.

11. The communications system of claim 9, wherein the source of the video content or still image is identified in a user profile database.

12. The communications system of claim 9, wherein the source of the video content or still image is a database identified by a Uniform Resource Identifier.

13. The communications system of claim 9, further comprising:
a camera that provides a video feed separate from the first device, wherein the video feed provides the video content.

14. The communications system of claim 9, wherein the camera on the first device is disabled when the device is used within the controlled-environment facility.

15. The communications system of claim 9, wherein the first device camera is disabled based at least in part upon the first device's location or a network to which the first device is attached.

16. The communications system of claim 9, wherein the added video content is an avatar that is animated based upon audio information content received from the first device.

17. A non-transitory computer-readable storage medium having program instructions stored thereon that:
upon execution by a controlled-environment facility communications processing system cause the controlled-environment facility communications processing system to establish a video conferencing session between a first device and a second device, the first device comprising no camera or a camera disabled based at least in part upon one or more of a device identifier, location, called party, calling party, security designation, or time, such that the communications management system receives only audio information from the first device and receives both audio and video information from the second device; and
upon execution by a video processing module cause the video processing module to select video content or still image, not captured by the first device during the video conferencing session, based at least in part upon a user profile, and add the video content or still image to video conferencing session data from the first device before sending the video conferencing session data to the second device.

* * * * *